(12) United States Patent
Masuda et al.

(10) Patent No.: US 11,148,563 B2
(45) Date of Patent: Oct. 19, 2021

(54) AIRBAG AND SEAT APPARATUS FOR VEHICLE

(71) Applicant: AISIN SEIKI KABUSHIKI KAISHA, Kariya (JP)

(72) Inventors: Satoshi Masuda, Kariya (JP); Ryosuke Mizuno, Kariya (JP); Makoto Sakai, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/937,728

(22) Filed: Jul. 24, 2020

(65) Prior Publication Data

US 2021/0039527 A1    Feb. 11, 2021

(30) Foreign Application Priority Data

Aug. 8, 2019 (JP) .............................. JP2019-146748

(51) Int. Cl.
*B60N 2/427* (2006.01)
*B60R 21/207* (2006.01)
*B60R 21/231* (2011.01)

(52) U.S. Cl.
CPC ........ *B60N 2/42754* (2013.01); *B60R 21/207* (2013.01); *B60R 21/231* (2013.01); *B60R 2021/23146* (2013.01)

(58) Field of Classification Search
None
See application file for complete search history.

(56) References Cited

U.S. PATENT DOCUMENTS

| 6,056,079 A * | 5/2000 | Cech ...................... | B60N 2/002 177/144 |
| 6,076,853 A * | 6/2000 | Stanley .................. | B60N 2/002 177/208 |
| 6,674,024 B2 * | 1/2004 | Cech ...................... | B60N 2/002 177/144 |
| 6,848,715 B2 * | 2/2005 | Nelson .................. | B60R 21/206 280/730.1 |
| 7,237,443 B2 * | 7/2007 | Speckhart ............ | B60N 2/7035 73/862.046 |

(Continued)

FOREIGN PATENT DOCUMENTS

JP    2018-069799 A    5/2018

*Primary Examiner* — Faye M Fleming
(74) *Attorney, Agent, or Firm* — Oblon, McClelland, Maier & Neustadt, L.L.P.

(57) ABSTRACT

An airbag includes plural bag portions respectively including two sheet members which are attached to each other, the plural bag portions arranged to be overlapped with each other in a thickness direction of the sheet member, and a welded portion at which the sheet members being in contact with each other are attached to each other. The welded portion includes a communication hole penetrating the sheet members which are in contact with each other to communicate the bag portions which are arranged to be overlapped with each other, and a rib portion arranged radially outward of the communication hole, the rib portion protruding in the thickness direction from a welded surface of the welded portion. The rib portion includes an annular rib surrounding the communication hole, and a cutout portion provided at the annular rib.

7 Claims, 8 Drawing Sheets

(56) References Cited

U.S. PATENT DOCUMENTS

| | | | |
|---|---|---|---|
| 7,354,106 B2* | 4/2008 | Dennis | B60N 2/4242 |
| | | | 297/216.17 |
| 9,630,532 B2 | 4/2017 | Schnell et al. | |
| 10,427,565 B2* | 10/2019 | Sasaki | B60N 2/4221 |

* cited by examiner

AIRBAG AND SEAT APPARATUS FOR VEHICLE

CROSS REFERENCE TO RELATED APPLICATIONS

This application is based on and claims priority under 35 U.S.C. § 119 to Japanese Patent Application 2019-146748, filed on Aug. 8, 2019, the entire content of which is incorporated herein by reference.

TECHNICAL FIELD

This disclosure generally relates to an airbag and a seat apparatus for a vehicle.

BACKGROUND DISCUSSION

A known airbag including plural bag portions formed by two sheet members which are attached to each other are overlapped with each other in a thickness direction of the sheet member is disclosed in U.S. Pat. No. 9,630,532B (hereinafter referred to as Patent reference 1). For example, the airbag disclosed in Patent reference 1 includes the plural bag portions arranged to be overlapped with each other in a thickness direction of the sheet member. The airbag includes a welded portion at which the sheet members being in contact with each other are attached, the sheet members of the airbag portions arranged to be overlapped with each other in the thickness direction of the sheet member. The welded portion includes a communication hole and plural rib portions. The communication hole communicates the bag portions arranged to be overlapped with each other in the thickness direction by penetrating the sheet members which are attached with each other. The plural rib portions are aligned radially to surround the communication hole.

That is, air may be difficult to be introduced between the two sheet members which are attached with each other in the thickness direction when the air starts to be introduced to the bag portion introduced with air via the communication hole which is provided at the welded portion. However, according to the aforementioned configuration, each of the rib portions provided at the welded portion includes an air path arranged between the rib portions which are adjacent to each other in a circumferential direction, the air path extending from the communication hole. The airbag disclosed in Patent reference 1 may smoothly and speedily fill the air into each of the bag portions.

However, any components of industrial products such as a vehicle are always required to improve the performance thereof. The airbag disclosed in Patent reference 1 may not always satisfy evolving requirement level.

A need thus exists for an airbag and a seat apparatus for a vehicle which is not susceptible to the drawback mentioned above.

SUMMARY

According to an aspect of the disclosure, an airbag includes plural bag portions respectively including two sheet members which are attached to each other, the plural bag portions arranged to be overlapped with each other in a thickness direction of the sheet member, and a welded portion at which the sheet members being in contact with each other are attached to each other, the sheet members of the bag portions arranged to be overlapped with each other in the thickness direction of the sheet member. The welded portion includes a communication hole penetrating the sheet members which are in contact with each other to communicate the bag portions which are arranged to be overlapped with each other, and a rib portion arranged radially outward of the communication hole, the rib portion protruding in the thickness direction from a welded surface of the welded portion. The rib portion includes an annular rib surrounding the communication hole, and a cutout portion provided at the annular rib.

According to another aspect of this disclosure, a seat apparatus for a vehicle includes an airbag arranged inside a seat surface of a seat, the airbag including includes plural bag portions respectively including two sheet members which are attached to each other, the plural bag portions arranged to be overlapped with each other in a thickness direction of the sheet member, and a welded portion at which the sheet members being in contact with each other are attached to each other, the sheet members of the bag portions arranged to be overlapped with each other in the thickness direction of the sheet member. The welded portion includes a communication hole penetrating the sheet members which are in contact with each other to communicate the bag portions which are arranged to be overlapped with each other, and a rib portion arranged radially outward of the communication hole, the rib portion protruding in the thickness direction from a welded surface of the welded portion. The rib portion includes an annular rib surrounding the communication hole, and a cutout portion provided at the annular rib.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
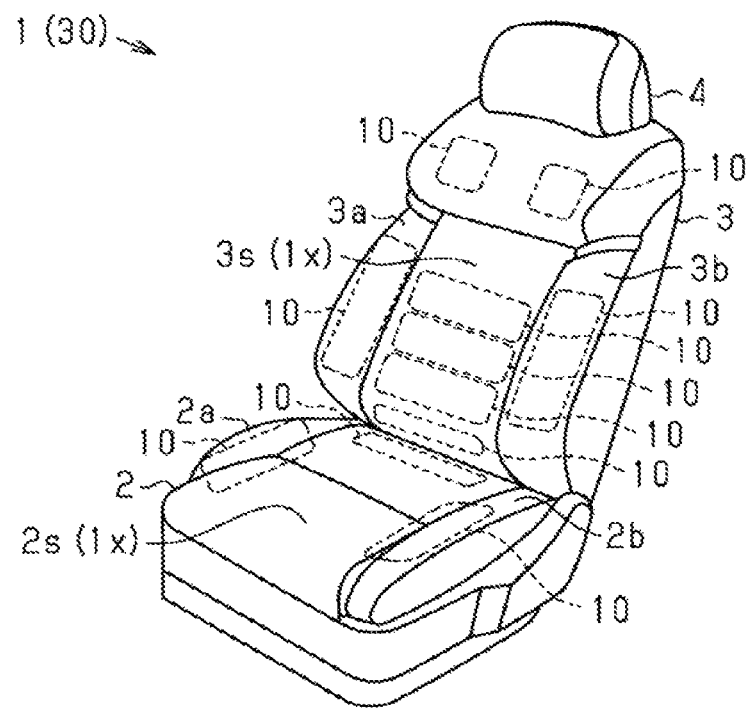
FIG. 1 is a perspective view of a vehicle seat including airbags inside a seat surface according to an embodiment disclosed here.
Figure 2:
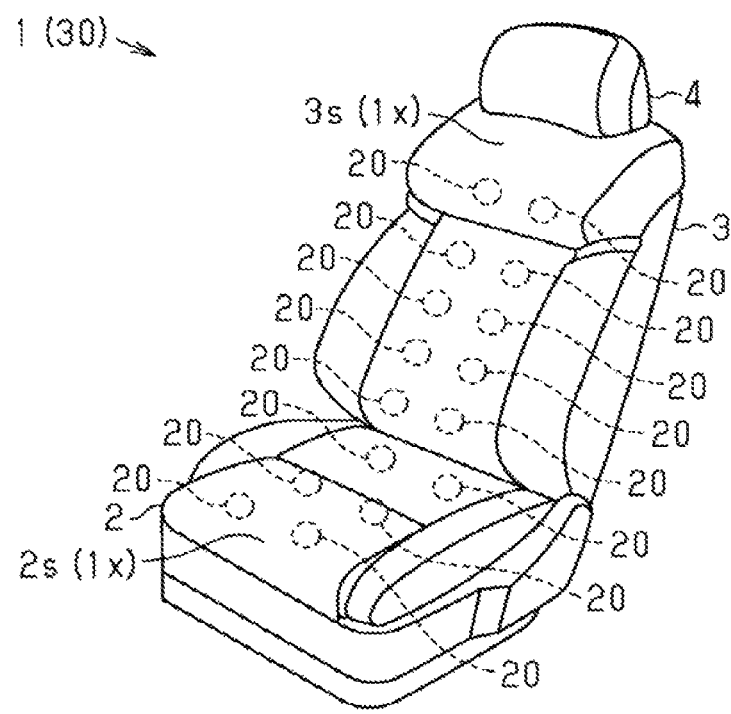
FIG. 2 is another perspective view of the vehicle seat including another type of airbags inside the seat surface.

An embodiment of an airbag and a seat apparatus for a vehicle will hereunder be explained with reference to the drawings. As shown in FIGS. 1 and 2, a seat 1 for the vehicle includes a seat cushion 2, and a seatback 3 provided at a rear end portion of the seat cushion 2. A headrest 4 is provided at an upper end of the seatback 3.

The seatback 3 includes side portions 3a, 3b which extend or expand forward. The seat cushion 2 includes side portions 2a, 2b which extend or expand upward. The seat 1 of the embodiment secures and maintains favorable seating posture of a passenger.

The seat 1 includes plural airbags 10 changing the support shape of the seat 1 by inflating or expanding and deflating or contracting within the seat cushion 2 and the seatback 3. The seat 1 also includes plural airbags 20 pressing seat surfaces 1x from inside of the seat cushion 2 and the seatback 3, respectively, by inflating and deflating within the seat cushion 2 and the seatback 3. In the embodiment, a seat apparatus 30 may change the support shape of the seat 1 and offer refreshment effect to the passenger seated on the seat 1.

Specifically, the seat 1 of the embodiment includes the dedicated airbags 10 for the seat support in the seatback 3 at positions supporting a shoulder portion, a lower back portion, and a lower end portion of a seatback surface 3s. The positions of the airbags 10 may be referred to as, for example, a shoulder portion, a lumbar portion, and a back pelvis portion. The dedicated airbags 10 for the seat support are provided at positions supporting the side portions 3a, 3b of the seatback 3. The dedicated airbags 10 for the seat support are provided inside the rear end portion of the seat surface 2s and inside the side portions 2a, 2b of the seat cushion 2.

The plural airbags 20 for refreshment are provided inside the seatback 3 so as to be aligned along the seatback surface 3s. The seat cushion 2 includes the plural airbags 20 for massaging function so as to be aligned along a seat surface 2s. In particular, the airbags 20 of the seatback 3 are aligned in two rows along the upper-lower direction of the seatback surface 3s. The airbags 20 of the seat cushion 2 are aligned in two rows along the front-rear direction of the seat surface 2s.

Figure 3:
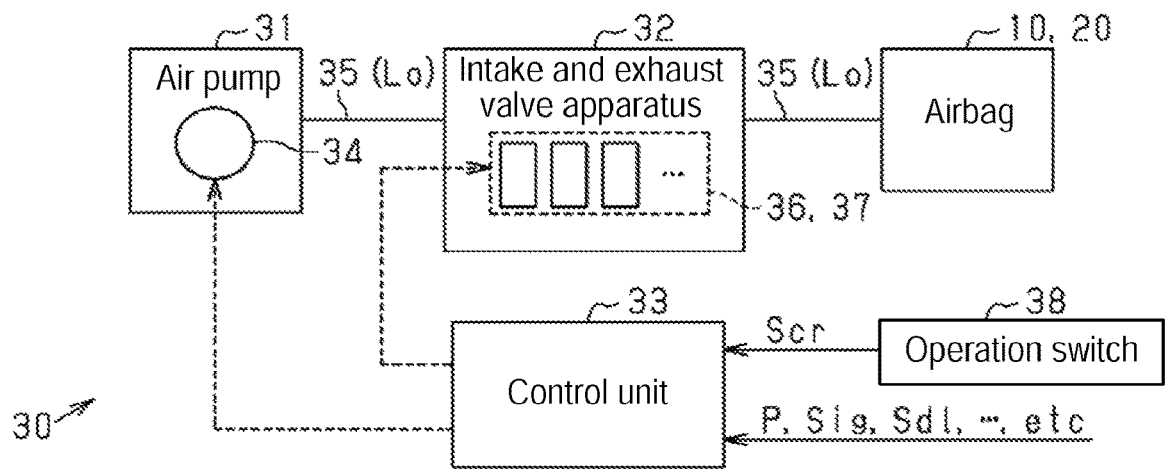
FIG. 3 is a schematic view illustrating a seat apparatus.

As shown in FIG. 3, the seat apparatus 30 of the embodiment includes an air pump 31 pumping air to the airbags 10 for the seat support and the airbags 20 for massaging function. Furthermore, an intake and exhaust valve apparatus 32 is provided between the air pump 31 and the airbags 10, 20. A control unit 33 of the seat apparatus 30 of the embodiment controls the operation of the air pump 31 and the intake and exhaust valve apparatus 32.

Specifically, the air pump 31 of the embodiment is an electric pump including or using a motor 34 as a drive source. The intake and exhaust valve apparatus 32 is connected to the airbags 20 and the air pump 31 via air tubes 35 which each is made of resin having flexibility. That is, in the seat apparatus 30 of the embodiment, air paths (intake and exhaust flow paths Lo) communicating the airbags 10, 20 and the air pump 31 are provided by inner paths of the air tubes 35 and the intake and exhaust valve apparatus 32. An intake valve 36 and an exhaust valve 37 of the intake and exhaust valve apparatus 32 of the embodiment are arranged at some positions of the intake and exhaust flow paths Lo.

An operation input signal Scr relative to an operation switch 38, an ignition signal Sig or a door lock signal Sdl provided at the seat 1 are inputted to the control unit 33 of the embodiment. The control unit 33 of the embodiment controls the operation of the air pump 31 and the intake and exhaust valve apparatus 32 so as to inflate and deflate the airbags 10, 20 based on control signals.

Specifically, the control unit 33 of the embodiment detects an inner pressure P of the airbags 10 for the seat support and maintains a target value of the inner pressure P. The inner pressure target value is updated by a user or a passenger who sets favorable seat support shape by using the operation switch 38 provided at the seat 1. The control unit 33 of the embodiment controls the operation of the air pump 31 and the intake and exhaust valve apparatus 32 so as to conform the inner pressure P of the airbags 10 to the inner pressure target value when the vehicle starts moving, for example, when the ignition is turned on, and the airbags 10 for the seat support inflate.

The control unit 33 of the embodiment switches the airbags 20 for massaging function to be inflated based on a predetermined movement of the passenger. According to the seat apparatus 30 of the embodiment, the passenger seated on the seat 1 may obtain desired refreshment effect.

The airbags 20 for refreshment of the seat apparatus 30 of the embodiment will hereunder be explained.

Figure 4:
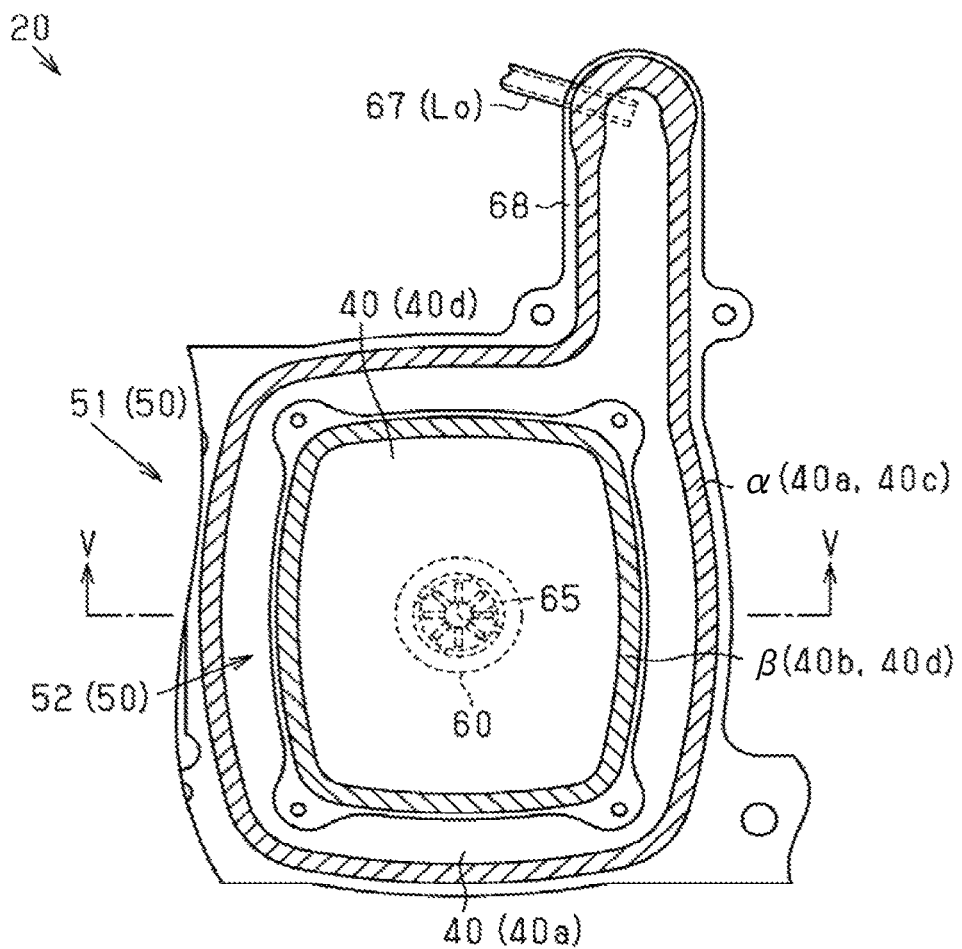
FIG. 4 is a plan view of the airbags.
Figure 5:
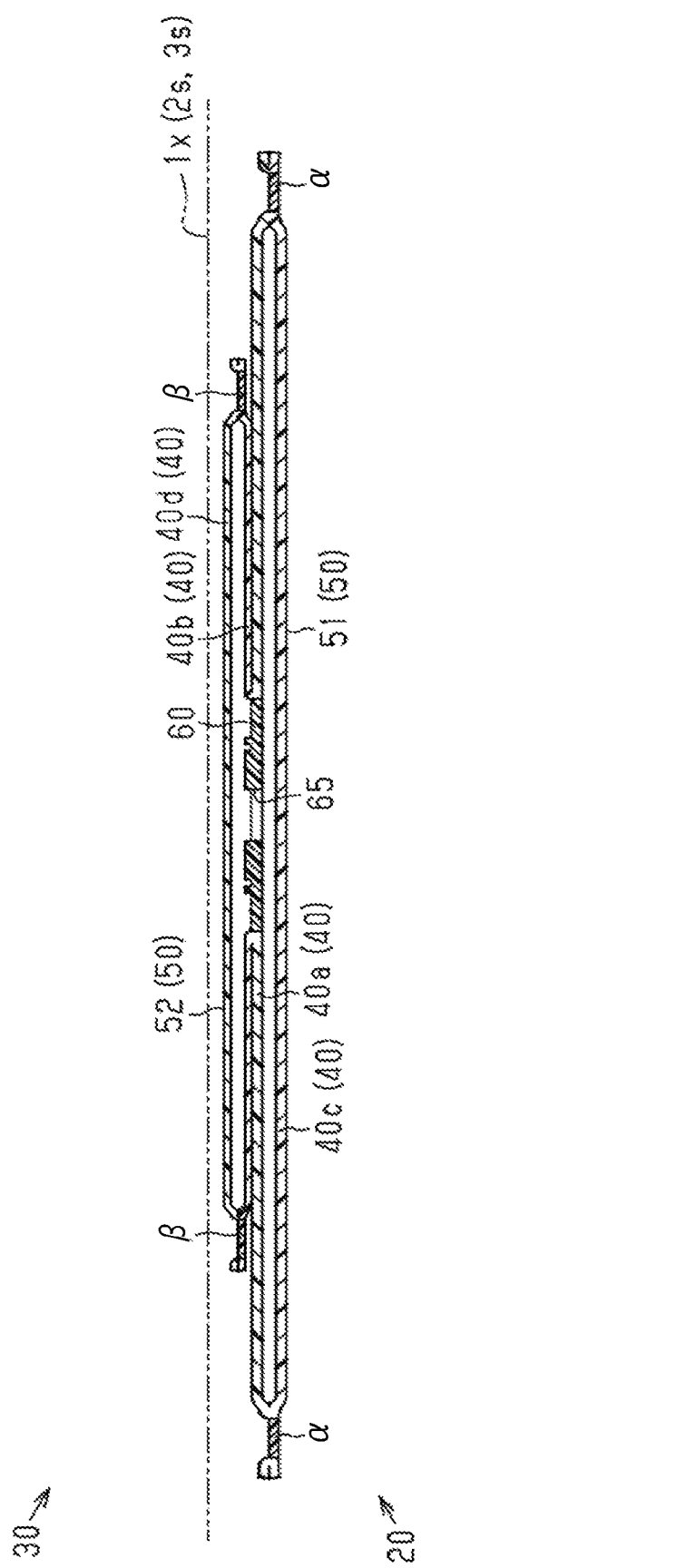
FIG. 5 is a cross sectional view of the airbags.
Figure 6:
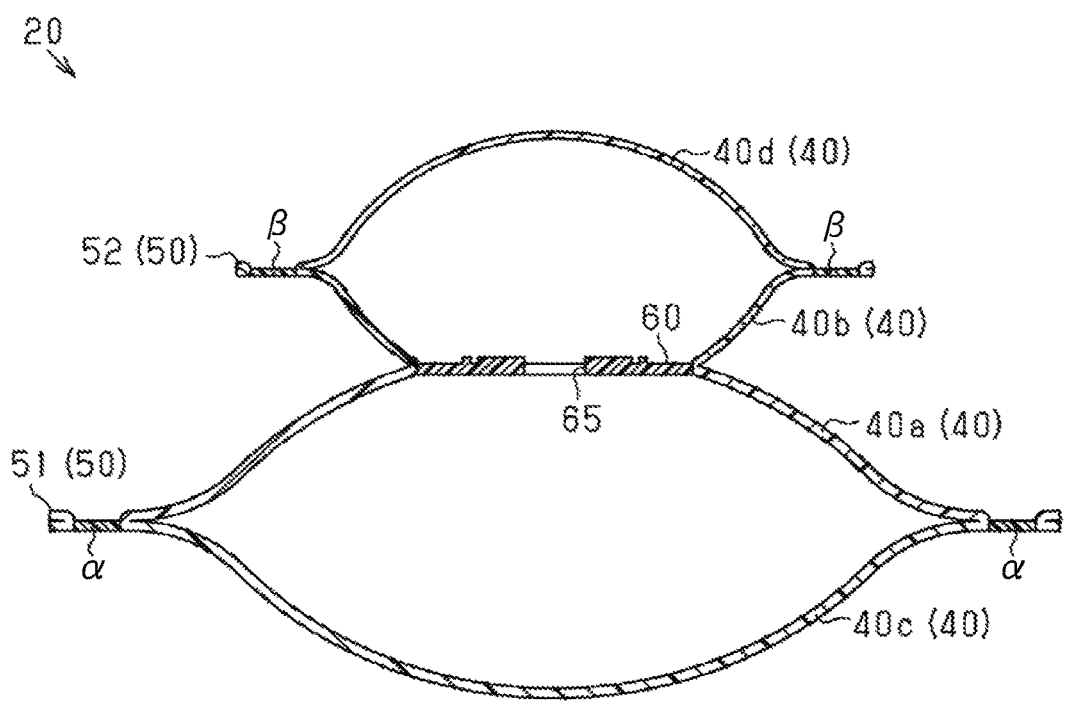
FIG. 6 is another cross sectional view of the airbags.

As shown in FIGS. 4 to 6, the airbag 20 for refreshment of the seat apparatus 30 of the embodiment includes plural bag portions 50 respectively formed by two sheet members 40, 40 which are attached to each other. In particular, the airbag 20 of the embodiment includes a first bag portion 51 and a second bag portion 52 both serving as the bag portions 50. The airbag 20 includes a configuration in which the first bag portion 51 and the second bag portion 52 are overlapped with each other in the thickness direction of the sheet member 40. The airbag 20 of the embodiment inflates largely in the thickness direction of the sheet member 40.

Specifically, as shown in FIG. 4, according to the airbag 20 of the embodiment, the first bag portion 51 and the second bag portion 52 each is formed in a substantially rectangular shape in a plan view when seen in the thickness direction of the sheet members 40. The first bag portion 51 of the airbag 20 of the embodiment includes the substantially rectangular shape larger than the second bag portion 52. As shown in FIG. 5, in the seat apparatus 30 of the embodiment, the airbags 20 are arranged inside the seat surface 1x in a state where the second bag portion 52 faces the seat surface 1x.

As shown in FIG. 4, in the airbag 20 of the embodiment, sheet members 40 of the bag portions 50 each is made from a flexible resin material. The bag portions 50 of the embodiment each is formed such that peripheral rim portions of the sheet members 40, 40 that are overlapped with each other in the thickness direction are welded to be attached with each other.

The sheet members 40, 40 are welded by, for example, high frequency welding. FIG. 4 shows welded portions α, β provided at the peripheral rim portions of the sheet members 40, 40 with a hatching pattern.

As shown in FIGS. 5 and 6, the airbag 20 of the embodiment includes welded portions 60 at which sheet members 40a, 40b which are in contact with each other are attached to each other, the sheet members 40a, 40b of the first bag portion 51 and the second bag portion 52, respectively, which are arranged to be overlapped with each other in the thickness direction of the sheet member 40. The welded portion 60 includes a communication hole 65 communicating the first bag portion 51 and the second bag portion 52 by penetrating the sheet members 40a, 40b. In the airbag 20 of the embodiment, the air filled in the first bag portion 51 and the second bag portion 52 flows therebetween via the communication hole 65 provided at the welded portion 60.

In particular, as shown in FIG. 4, the airbag 20 of the embodiment includes a substantially cylindrical air tube 67 having an end which is inserted in an inner space of the first bag portion 51 so as to be sandwiched between the sheet members 40, 40 when the sheet members 40, 40 configuring the first bag portion 51 are heat-welded. In the airbag 20 of the embodiment, the first bag portion 51 includes an extending portion 68 provided to extend a side of the first bag portion 51 which is formed in the quadrilateral shape, and the extending portion 68 includes the air tube 67 at a distal end portion thereof. In the airbag 20 of the embodiment, the air tube 67 is configured to be used at the intake and exhaust flow paths Lo.

That is, in the airbag 20 of the embodiment, the air introduced to the first bag portion 51 via the air tube 67 is introduced to the second bag portion 52 via the communication hole 65 provided at the welded portion 60. In the airbag 20 of the embodiment, the first bag portion 51 and the second bag portion 52 are configured to inflate by the introduction of the air.

In the airbag 20 of the embodiment, the air in the first bag portion 51 is discharged outside thereof via the air tube 67. The air filled in the second bag portion 52 is introduced to the first bag portion 51 via the communication hole 65 provided at the welded portion 60 to be discharged outside of the airbag 20 via the air tube 67. According to the airbag 20 of the embodiment, the first bag portion 51 and the second bag portion 52 deflate by the discharge of the air.

Figure 7:
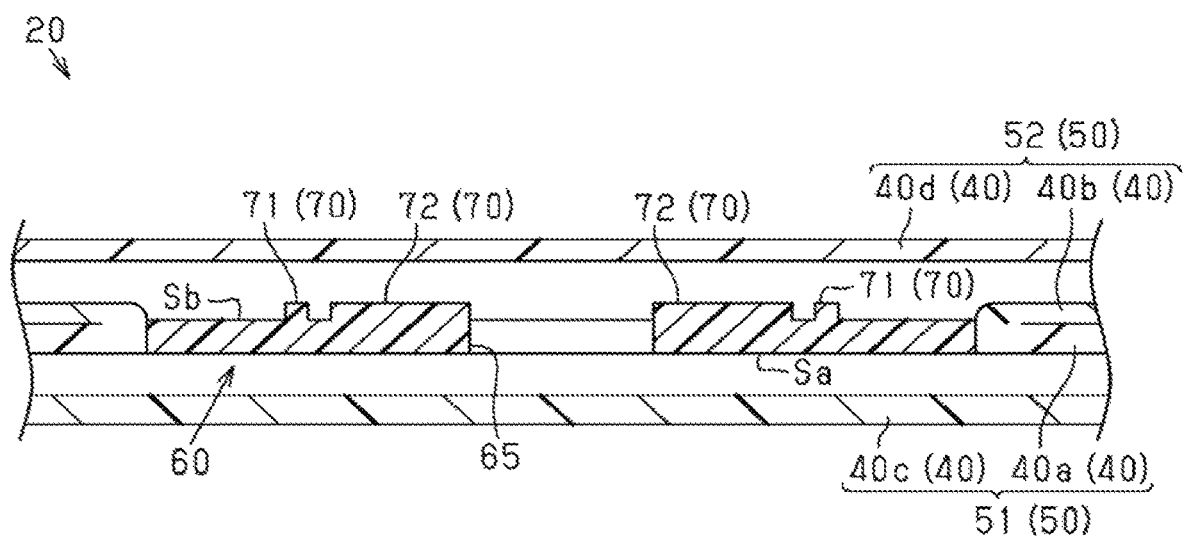
FIG. 7 is a cross sectional view of a welded portion.
Figure 8:
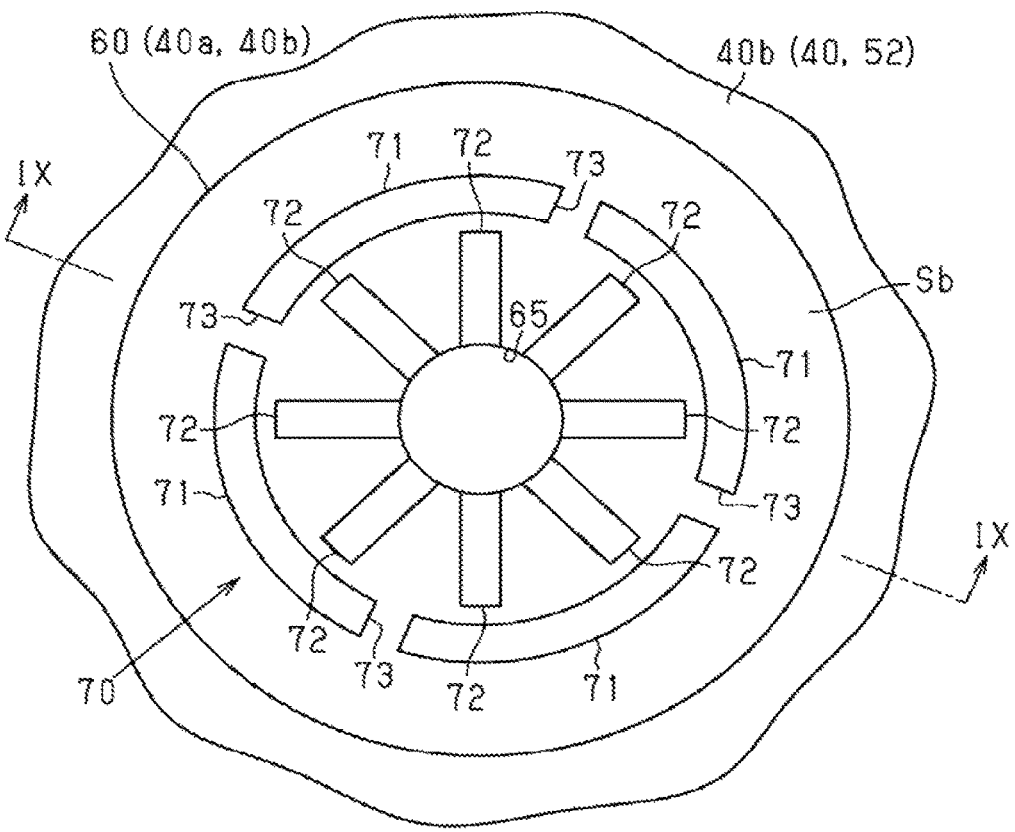
FIG. 8 is a plan view of the welded portion.
Figure 9:
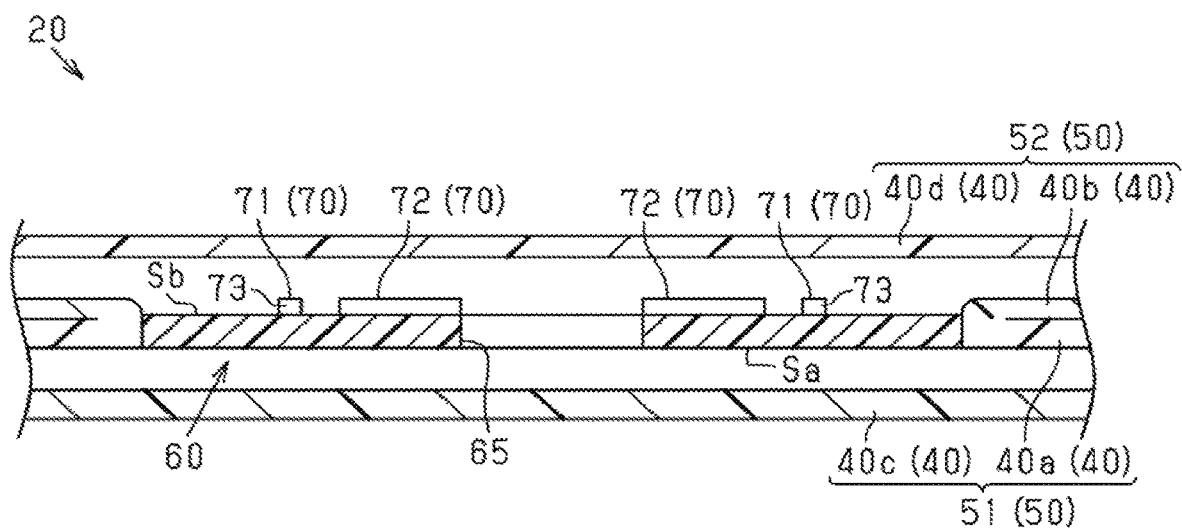
FIG. 9 is another cross sectional view of the welded portion.

In particular, as shown in FIGS. 7 to 9, the welded portion 60 of the embodiment includes a substantially circular shape in a plan view when seen from the thickness direction of the sheet member 40. The welded portion 60 includes the communication hole 65 at a center part of the welded portion 60 which is formed in the circular shape. The welded portion 60 includes a rib portion 70 protruding in the thickness direction of the sheet member 40 from a welded surface Sb of the second bag portion 52 of a welded surface Sa of the first bag portion 51 (lower in FIGS. 7 and 9) and the welded surface Sb of the second bag portion 52 (upper in FIGS. 7 and 9). The welded portion 60 of the embodiment is configured to secure an air flow path introducing air from the first bag portion 51 which is arranged upstream to the second bag portion 52 which is arranged downstream via the communication hole 65 by the rib portion 70 provided radially outward of the communication hole 65.

Specifically, the rib portion 70 of the embodiment includes an annular rib 71 and plural radial ribs 72. The annular rib 71 includes a substantially annular outer shape and surrounds radially outward of the communication hole 65. The radial ribs 72 are radially arranged to surround the communication hole 65 at positions radially inward of the annular rib 71. The radial ribs 72 of the rib portion of the embodiment each is arranged radially outward of the communication hole 65 and formed in a substantially linear shape extending in a radial direction thereof. The rib portion 70 of the embodiment includes, for example the eight radial ribs 72 arranged equiangularly in the circumferential direction of the communication hole 65. The rib portion 70 of the embodiment includes, for example, four cutout portions 73 arranged equiangularly in the circumferential direction of the annular rib 71 at positions displaced in the circumferential direction with respect to the radial ribs 72.

That is, in the welded portion 60 of the embodiment, the air introduced from the first bag portion 51 to the second bag portion 52 via the communication hole 65 is introduced to a clearance arranged between the radial ribs 72 which are adjacent to each other in the circumferential direction. In a case where, for example, the air within the airbag 20 is discharged, that is, in a case where the airbag 20 of the embodiment is in the completely deflated state, the air filled in the first bag portion 51 is introduced to the second airbag portion 52 via the communication hole 65.

In the airbag 20 of the embodiment, the sheet members 40c, 40d configuring the first bag portion 51 and the second bag portion 52 by being attached to the sheet members 40a, 40b, respectively, the sheet members 40a, 40b which are adjacent to each other, face the communication hole 65 provided at the welded portion 60 in the thickness direction of the sheet member 40. Accordingly, in a case where, for example, the airbag 20 is in the fully deflated state, the sheet member 40d of the second bag portion 52 arranged downstream while sandwiching the communication hole 65 with the first bag portion 51 may block the communication hole 65 facing in the thickness direction of the sheet member 40d. Accordingly, the first bag portion 51 and the second bag portion 52 may not smoothly inflate.

That is, for example, in a case where the airbag 20 inflates from the fully-deflated state, only the first bag portion 51 in which the air is introduced via the air tube 67 may inflate by the sheet member 40d of the second bag portion 52 which blocks the communication hole 65. This state maintains until the air pressure level of the first bag portion 51 increases greater than the force for pressing the sheet member 40d of the second bag portion 52 toward the communication hole 65, that is, an atmosphere pressure level.

In a case where the sheet member 40d blocking the communication hole 65 is detached or separated from the communication hole 65, the large amount of air is introduced from the first bag portion 51 to the second bag portion 52. Thus, the second bag portion 52 abruptly inflates and may generate noise.

To consider this, the welded portion 60 of the embodiment is configured such that the annular rib 71 surrounding radially outward of the communication hole 65 is in contact with the sheet member 40d facing the communication hole 65 to form a clearance between the sheet member 40d and the communication hole 65. Accordingly, the airbag 20 of the embodiment may inhibit the sheet member 40d from blocking the communication hole 65.

The welded portion 60 of the embodiment is configured such that, in a state where the sheet member 40d is in contact with the annular rib 71, the air introduced to the second bag portion 52 via the communication hole 65 is discharged outside from an inner side of the annular rib 71 via the cutout portion 73. The airbag 20 of the embodiment secures the flow path of the air introduced to the second bag portion 52 which is arranged downstream from the first bag portion 51 which is arranged upstream via the communication hole 65, and may smoothly inflate the first bag portion 51 and the second bag portion 52.

Figure 10:
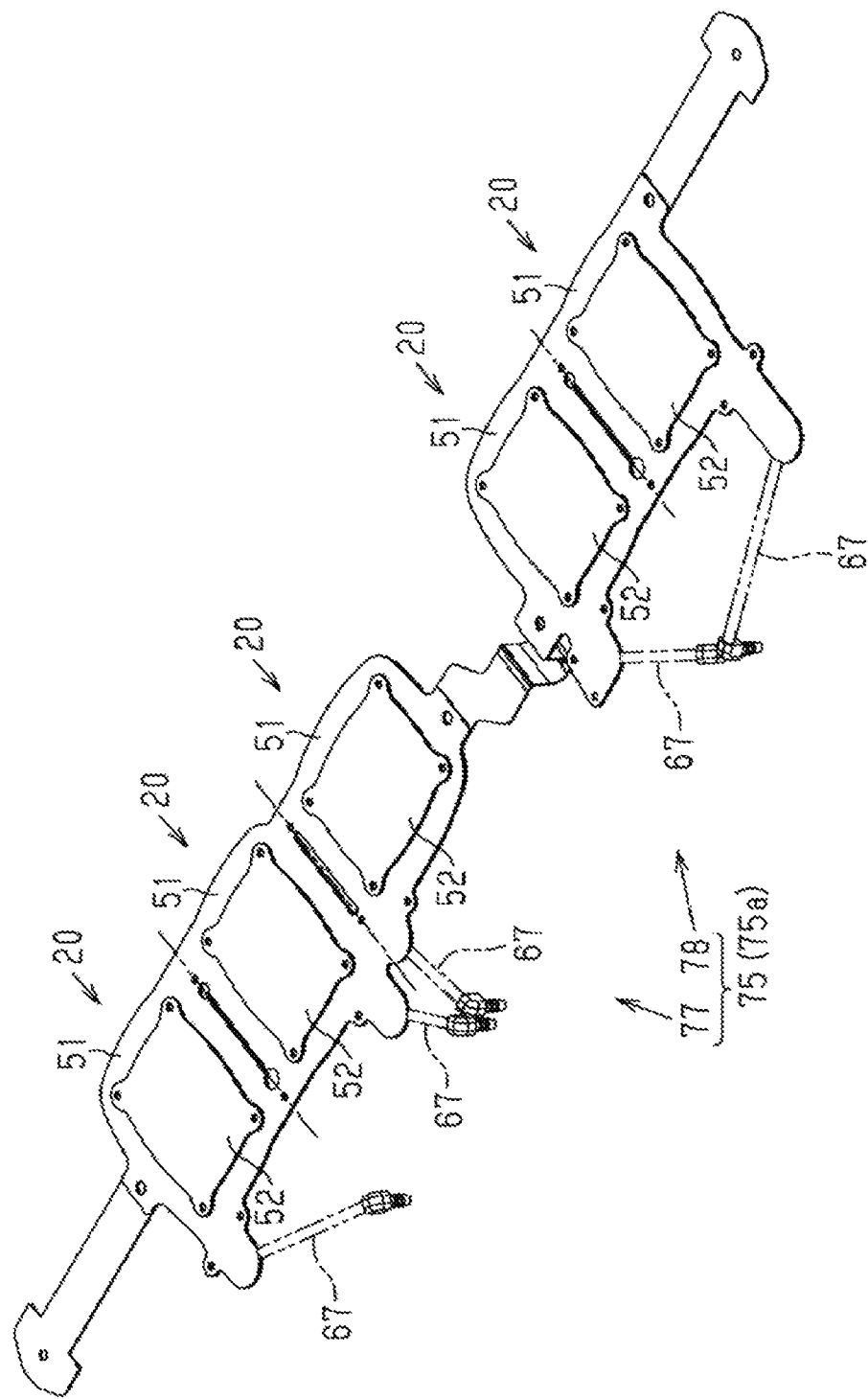
FIG. 10 is a perspective view of an airbag assembly or an airbag assy.
Figure 11:
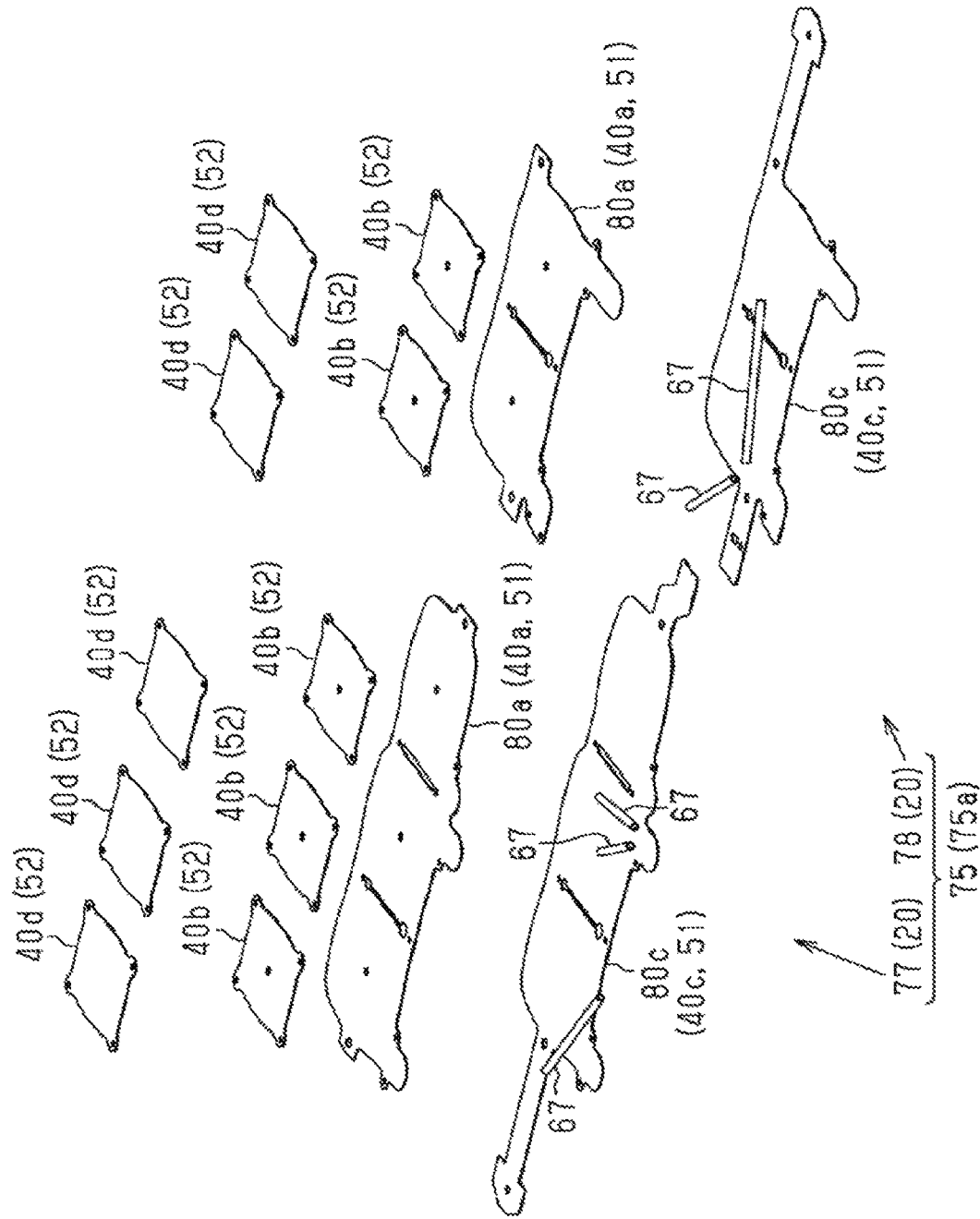
FIG. 11 is an exploded perspective view of the airbag assembly.

More specifically, as shown in FIGS. 10 and 11, the seat apparatus 30 of the embodiment includes an airbag assembly 75 or an airbag assy 75 for refreshment, the airbag assembly 75 integrally formed with the plural airbags 20 including the aforementioned configuration.

In particular, the airbag assembly 75 of the seat apparatus 30 of the embodiment includes a subassembly or subassy 77 and a subassembly, or subassy 78. The subassembly 77 has, for example, the three airbags 20 which are integrally provided. The subassembly 78 has, for example, the two airbags 20 which are integrally provided. Each of the subassemblies 77, 78 includes a sheet member 80a and a sheet member 80c. The sheet member 80a is integrally provided with the sheet member 40a of the two sheet members 40a, 40c configuring the first bag portion 51 of the airbag 20, the sheet member 40a in which the welded portion 60 having the communication hole 65 is provided. The sheet member 80c is integrally provided with the sheet member 40c of the two sheet members 40a, 40c configuring the first bag portion 51 of the airbag 20. That is, the seat apparatus 30 of the embodiment is provided with the first bag portion 51 of the airbag 20 having the subassemblies 77, 78 by overlapping the sheet member 80a and the sheet member 80c in the thickness direction thereof and by heat-welding the sheet member 80a and the sheet member 80c. The subassemblies 77, 78 of the embodiment are configured such that the sheet members 40b, 40d which configure the second bag portions 52 are stacked on the sheet member 80a by the number of sets corresponding to the number of the airbags 20 which are integrally provided.

The airbag assembly 75 of the seat apparatus 30 of the embodiment is provided per arrangement segment set or specified at the right and left of the seat cushion 2, the seatback 3, and the seat 1. In the seat apparatus 30 of the embodiment, an airbag assembly 75a including, for example, the five airbags 20 by linearly connecting the subassemblies 77, 78 is arranged at the arrangement segment which is set at the right and left of the seatback 3. The subassembly 77 including, for example, the three airbags 20 is arranged as the airbag assembly 75 at the arrangement segment which is set at the right and left of the seat cushion 2.

The airbag assembly 75 of the seat apparatus 30 of the embodiment is arranged at each of the segments in a state where the second bag portion 52 of the airbag 20 faces the seat surface 1x. Accordingly, the airbag 20 of the seat apparatus 30 of the embodiment is arranged inside the seat surface 1x in a state where a welded surface Sb of the welded portion 60 having the rib portion 70 faces the seat surface 1x.

That is, the seat 1 of the vehicle may be partially applied with a large load relative to the seat surface 1x in a case where the passenger puts or touches his/her hand on the seat surface 2s or the seatback surface 3s. Accordingly, the sheet member 40d of the airbag 20 arranged inside the seat surface 1x is deflected so that the sheet member 40d may block the communication hole 65 of the welded portion 60 facing the sheet member 40d in the thickness direction.

However, in the seat apparatus 30 of the embodiment, even in this case, the rib portion 70 provided at the welded surface Sb facing the seat surface 1x may inhibit the sheet member 40d from blocking the communication hole 65. In the seat apparatus 30 of the embodiment, the airbag 20 smoothly inflates by securing the flow path of the air introduced to the second bag portion 52 arranged downstream from the first bag portion 51 arranged upstream by sandwiching the communication hole 65 therebetween.

The advantage and effect of the embodiment will hereunder be explained.

According to the aforementioned embodiment, the airbag 10, 20 includes the plural bag portions 51, 52 respectively including two sheet members 40, 40 which are attached to each other, the plural bag portions 51, 52 arranged to be overlapped with each other in the thickness direction of the sheet member 40, 40, and the welded portion 60, 60B, 60C at which the sheet members 40, 40 being in contact with each other are attached to each other, the sheet members 40, 40 of the bag portions 51, 52 arranged to be overlapped with each other in the thickness direction of the sheet member 40, 40. The welded portion 60, 60B, 60C includes the communication hole 65 penetrating the sheet members 40, 40 which are in contact with each other to communicate the bag portions 51, 52 which are arranged to be overlapped with each other, and the rib portion 70, 70B, 70C arranged radially outward of the communication hole 65, the rib portion 70, 70B, 70C protruding in the thickness direction from a welded surface 75, 75a of the welded portion 60, 60B, 60C. The rib portion 70, 70B, 70C includes the annular rib 71 surrounding the communication hole 65, and a cutout portion 73 provided at the annular rib.

That is, the first bag portion 51 and the second bag portion 52 respectively formed by the attachment of the two sheet members 40, 40 are overlapped in the thickness direction of the sheet member 40, and the sheet members 40c, 40d which are attached to the sheet members 40a, 40b, respectively, the sheet members 40a, 40b which are in contact with each other, face the communication hole 65 provided at the welded portion 60. Thus, for example, in a case where the air within the airbag 20 is discharged, that is, the airbag 20 is in fully deflated state, the sheet member 40d of the second bag portion 52 arranged downstream by sandwiching the communication hole 65 with respect to the first bag portion 51 may block the communication hole 65 which faces in the thickness direction when the airbag 20 is filled with air.

However, according to the embodiment, the annular rib 71 surrounding radially outward of the communication hole 65 is in contact with the sheet member 40d which faces the communication hole 65, and the clearance is provided between the sheet member 40d and the communication hole 65. Thus, the communication hole 65 may be inhibited from being blocked by the sheet member 40d.

In a state where the sheet member 40d is in contact with the annular rib 71, the air introduced to the second bag portion 52 via the communication hole 65 is discharged outside from the inner side of the annular rib 71 via the cutout portion 73. Accordingly, the flow path of the air introduced to the second bag portion 52 which is arranged downstream of the first bag portion 51 which is arranged upstream via the communication hole 65 may be secured to smoothly inflate the first bag portion 51 and the second bag portion 52.

According to the aforementioned embodiment, the rib portion 70, 70B, 70C includes the plural radial ribs 72, 72B, 72C which are arranged radially inward of the annular rib 71, the plural radial ribs 72, 72B, 72C radially surrounding the communication hole 65 and extending in the radial direction of the communication hole 65.

According to the aforementioned configuration, the air introduced to the second bag portion 52 from the first bag portion 51 via the communication hole 65 is introduced to the clearance arranged between the radial ribs 72 which are adjacent to each other in the circumferential direction. Accordingly, the flow path of the air introduced to the second bag portion 52 which is arranged downstream of the first bag portion 51 from the first bag portion 51 which is arranged upstream of the second bag portion 52 via the communication hole 65 may be effectively secured.

According to the aforementioned embodiment, the cutout portion 73 is arranged at the position displaced in the circumferential direction of the annular rib 71 relative to the radial rib 72, 72B, 72C.

According to the aforementioned configuration, the air introduced to the second bag portion 52 from the first bag portion 51 via the communication hole 65 may be further smoothly discharged outside from inside the annular rib 71 via the cutout portion 73.

According to the aforementioned embodiment, the radial rib 72, 72B, 72C protrudes in the thickness direction relative to the annular rib 71. The airbag 20 of the seat apparatus 30 for the vehicle is arranged inside the seat surface 1x in a state where the welded surface Sb of the welded portion 60 having the lib portion 70 faces the seat surface 1x.

That is, the seat 1 of the vehicle may be partially applied with a large load relative to the seat surface 1x in a case where the passenger puts or touches his/her hand on the seat surface 2s or the seatback surface 3s. Accordingly, the sheet member 40d of the airbag 20 arranged inside the seat surface 1x is deflected so that the sheet member 40d may block the communication hole 65 of the welded portion 60 facing the sheet member 40d in the thickness direction.

However, even in this case, the rib portion 70 provided at the welded surface Sb facing the seat surface 1x may inhibit the sheet member 40d from blocking the communication hole 65. Accordingly, the first bag portion 51 and the second bag portion 52 smoothly inflate by securing the flow path of the air introduced to the second bag portion 52 arranged downstream from the first bag portion 51 arranged upstream via the communication hole 65.

Only one side of the rib portion 70 protrudes in the thickness direction of the sheet member 40, meaning that the rib portion 70 may be easily formed. The rib portion 70 may include the large protruding amount. Accordingly, the flow path of the air introduced to the second bag portion 52 which is arranged downstream of the first bag portion 51 from the first bag portion 51 which is arranged upstream of the second bag portion 52 via the communication hole 65 may be further effectively secured.

The aforementioned embodiment may be modified as follows.

In the aforementioned embodiment, the rib portion 70 includes the annular rib 71 and the eight radial ribs 72 arranged radially inward of the annular rib 71. The annular rib 71 includes the four cutout portions 73 arranged equiangularly in the circumferential direction of the annular rib 71 at the positions displaced in the circumferential direction relative to the radial ribs 72. Alternatively, the respective numbers of radial ribs 72 and the cutout portions 73 may be freely changed. For example, the cutout portions 73 may be one. The cutout portions 73 may be arranged so as to overlap the positions of the radial ribs 72 in the circumferential direction. The rib portion 70 does not have to include the radial ribs 72.

Figure 12:
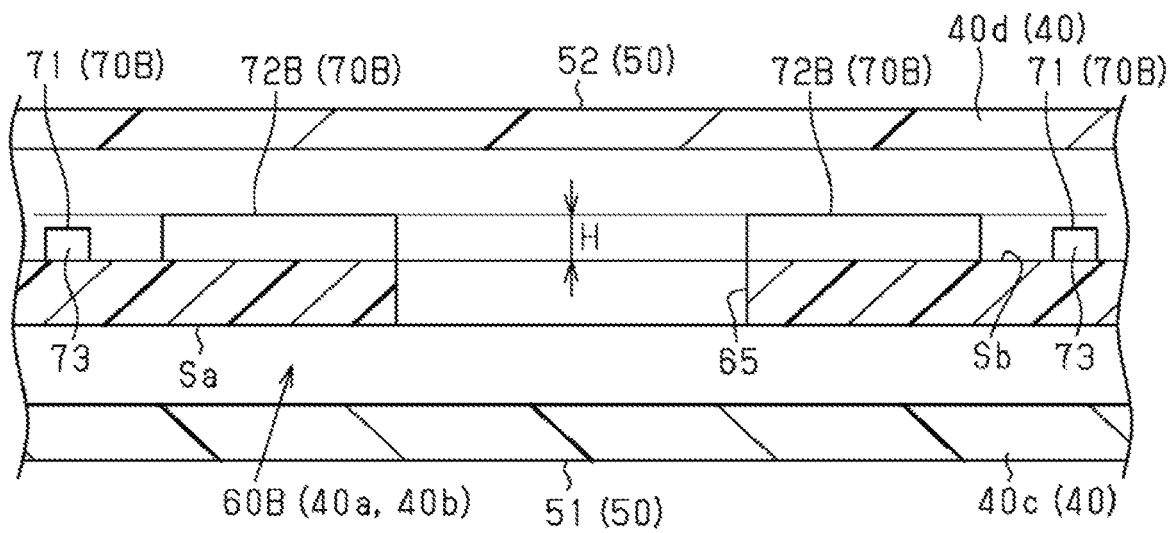
FIG. 12 is a cross sectional view of a welded portion of a modified example of the embodiment.

As shown in FIG. 12, a rib portion 70B of a welded portion 60B may include configuration in which each of the radial ribs 72B protrudes more than the annular rib 71 in the thickness direction of the sheet member 40. That is, as such, a protruding amount H of each of the radial ribs 72B increases based on the welded surface Sb having the rib portion 70B, and the radial ribs 72B come in contact with the sheet member 40d facing the communication hole 65 in advance with respect to the annular rib 71. Accordingly, the clearance between the sheet member 40d and the annular rib 71 may effectively secure the flow path of the air introduced to the second bag portion 52 which is arranged downstream of the first bag portion 51 from the first bag portion 51 which is arranged upstream of the second bag portion 52 via the communication hole 65.

Figure 13:
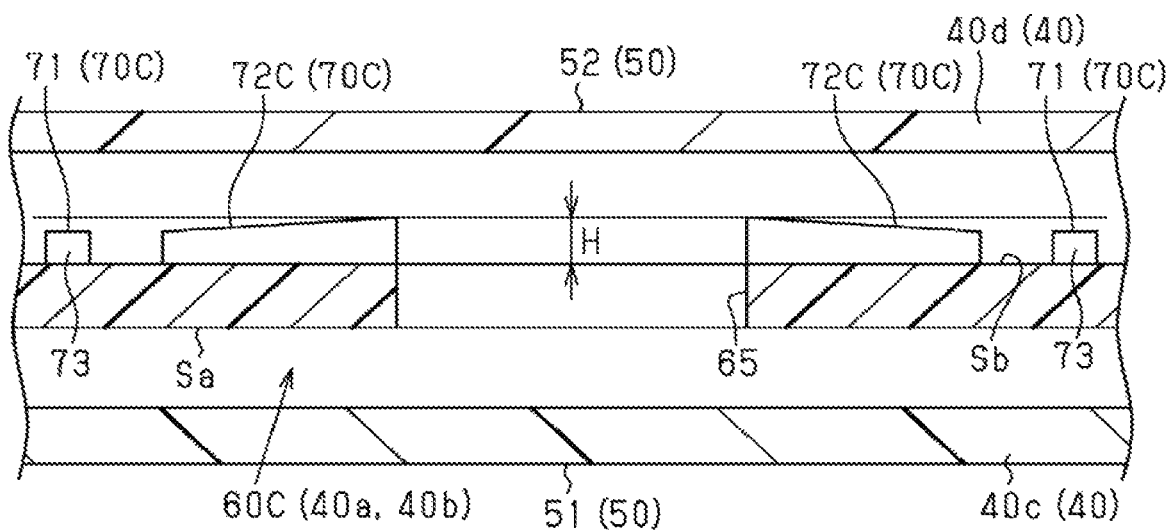
FIG. 13 is a cross sectional view of a welded portion of still another modified example of the embodiment.

As shown in FIG. 13, a rib portion 70C of a welded portion 60C is configured such that the protruding amount H of each of radial ribs 72C may increase toward radially inward thereof. Accordingly, the flow path of the air introduced to the second bag portion 52 which is arranged downstream of the first bag portion 51 from the first bag portion 51 which is arranged upstream of the second bag portion 52 via the communication hole 65 may be further effectively secured.

In the aforementioned embodiment, the airbag 20 which inflates is configured such that the first bag portion 51 is arranged upstream of the second bag portion 52, the second bag portion 52 is arranged downstream of the first bag portion 51, and the communication hole 65 is sandwiched by the first bag portion 51 and the second bag portion 52.

Alternatively, the second bag portion 52 may be arranged upstream of the first bag portion 51 and the first bag portion 51 may be arranged downstream of the second bag portion 52. In this case, the first bag portion 51 arranged downstream of the second bag portion 52 may be provided with the rib portion 70 at the welded surface Sa.

According to the aforementioned embodiment, the rib portion 70 protrudes only in one direction of the thickness direction of the sheet member 40. Alternatively, the rib portion 70 protrudes in the opposing directions in the thickness direction. That is, the rib portions 70 may be provided at the welded surface Sa at the first bag portion 51 and the welded surface Sb at the second bag portion 52.

In the aforementioned embodiment, the airbag 20 includes the first bag portion 51 and the second bag portion 52 which are arranged to be overlapped with each other in the thickness direction of the sheet member 40. Alternatively, for example, the three and more bag portions 50 may be arranged to be overlapped with each other in the thickness direction of the sheet member 40. That is, in this case, the welded portion 60 is provided at each of the sheet members 40, 40 of the bag portion 50 which are overlapped with each other in the thickness direction thereof, the sheet members 40, 40 which are in contact with each other. In this case, when seen in a plan view from the thickness direction of the sheet member 40, the welded portion 60 may be arranged to be overlapped with each other, or may be arranged to be displaced from each other.

The material, the shape, and the attachment method of the sheet members 40 configuring the bag portions 50 of the airbag 20 may be freely changed.

In the aforementioned embodiment, the airbag 20 for refreshment configuring the seat apparatus 30 of the seat 1 of the vehicle is concretely explained. Alternatively, the disclosure may be applied to the airbag 10 for the seat support. This disclosure may also be applied to airbags other than the airbags for the seat apparatus 30.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An airbag, comprising:
a plurality of bag portions respectively including two sheet members which are attached to each other, the plurality of bag portions arranged to be overlapped with each other in a thickness direction of the sheet member; and
a welded portion at which the sheet members being in contact with each other are attached to each other, the sheet members of the bag portions arranged to be overlapped with each other in the thickness direction of the sheet member; wherein
the welded portion includes
a communication hole penetrating the sheet members which are in contact with each other to communicate the bag portions which are arranged to be overlapped with each other; and a rib portion arranged radially outward of the communication hole, the rib portion protruding in the thickness direction from a welded surface of the welded portion, and the rib portion includes an annular rib surrounding the communication hole; and a cutout portion provided at the annular rib.

2. The airbag according to claim 1, wherein the rib portion includes a plurality of radial ribs which is arranged radially inward of the annular rib, the plurality of radial ribs radially surrounding the communication hole and extending in a radial direction of the communication hole.

3. The airbag according to claim 2, wherein the cutout portion is arranged at a position displaced in a circumferential direction of the annular rib relative to the radial rib.

4. The airbag according to claim 2, wherein the radial rib protrudes in the thickness direction relative to the annular rib.

5. The airbag according to claim 4, wherein the radial rib is configured to increase a protruding amount thereof in the thickness toward radially inward thereof.

6. A seat apparatus for a vehicle comprising an airbag arranged inside a seat surface of a seat, the airbag including;

a plurality of bag portions respectively including two sheet members which are attached to each other, the plurality of bag portions arranged to be overlapped with each other in a thickness direction of the sheet member; and a welded portion at which the sheet members being in contact with each other are attached to each other, the sheet members of the bag portions arranged to be overlapped with each other in the thickness direction of the sheet member; wherein the welded portion includes a communication hole penetrating the sheet members which are in contact with each other to communicate the bag portions which are arranged to be overlapped with each other; and a rib portion arranged radially outward of the communication hole, the rib portion protruding in the thickness direction from a welded surface of the welded portion, and the rib portion includes an annular rib surrounding the communication hole; and a cutout portion provided at the annular rib.

7. The seat apparatus according to claim 6, wherein the rib portion protrudes in one direction of the thickness direction; and the airbag is arranged inside the seat surface in a state where the welded surface including the rib portion faces the seat surface.

* * * * *